United States Patent

Arisaka et al.

[11] Patent Number: 5,923,494
[45] Date of Patent: Jul. 13, 1999

[54] MAGNETIC TAPE DEVICE AND METHOD OF CONTROLLING MAGNETIC TAPE DEVICE

[75] Inventors: Toshihiro Arisaka; Yasuhiro Nemoto; Kazuo Sakai; Kouetsu Okuyama, all of Ibaraki-ken; Kenji Toki, Kanagawa-ken, all of Japan

[73] Assignee: Hitachi, Ltd., Tokyo, Japan

[21] Appl. No.: 08/618,600

[22] Filed: Mar. 20, 1996

[30] Foreign Application Priority Data

Mar. 20, 1995 [JP] Japan ................................. 7-060366

[51] Int. Cl.⁶ .................................................. G11B 5/55
[52] U.S. Cl. ................................... 360/78.02; 360/75
[58] Field of Search ............................ 360/71, 78.02, 360/77.12, 74.3, 75

[56] References Cited

U.S. PATENT DOCUMENTS

| 4,321,634 | 3/1982 | Lehureau | 360/77.12 X |
| 4,472,750 | 9/1984 | Klumpp et al. | 360/78.02 X |
| 4,858,039 | 8/1989 | Mintzlaff | 360/78.02 X |
| 5,053,900 | 10/1991 | Hasegawa et al. | 360/85 X |
| 5,153,785 | 10/1992 | Muranushi et al. | 360/75 |
| 5,379,165 | 1/1995 | Pahr | 360/77.12 X |

FOREIGN PATENT DOCUMENTS

| 61-182621 | 8/1986 | Japan . |
| 4-209310 | 7/1992 | Japan . |
| 5-46961 | 2/1993 | Japan . |

*Primary Examiner*—Thang V. Tran
*Assistant Examiner*—K Wong
*Attorney, Agent, or Firm*—Antonelli, Terry, Stout & Kraus, LLP

[57] ABSTRACT

There is provided a magnetic tape device capable of highly accurate positioning at a high speed. For this purpose, the head is driven in the direction of the width of the tape by eliminating the friction between the tape the head. In order to allow positioning in the direction of the width of the tape, even if a servo signal cannot be read from a servo track, the absolute position of the head from a reference position is detected, and the head is controlled based on the absolute position.

11 Claims, 12 Drawing Sheets

MAGNETIC TAPE DEVICE AND METHOD OF CONTROLLING MAGNETIC TAPE DEVICE

BACKGROUND OF THE INVENTION

The present invention relates to magnetic tape devices for recording data on a magnetic tape (hereinafter simply referred to as a "tape") or for reproducing data from the tape and, more particularly, to a magnetic tape device which performs a positioning operation by driving a magnetoelectric conversion element (hereinafter referred to as a "head core") in the direction of the width of the tape.

Such magnetic tape devices are used as an auxiliary storage device for computers and, in addition, as an auxiliary storage device for backing up magnetic disc devices, which are also used as an auxiliary storage device. In such magnetic tape devices, data is managed on the basis of a plurality of tracks, which are band-shaped data storage areas provided in parallel in the longitudinal direction of a tape, and blocks, which are strip-shaped data storage areas defined by dividing the tracks into pieces having a predetermined length in the longitudinal direction thereof.

For example, known conventional magnetic tape devices include fixed head type devices, such as the magnetic tape device Model 3490 from IBM Corp., U.S.A., wherein a multiplicity of head cores are arranged in parallel in the direction of the width of a tape to read and write the same number of data tracks simultaneously.

In this type of device, when the number of tracks per unit length in the direction of the width of a tape (track density) is increased to increase the storage capacity of the tape, the intervals between the adjoining head cores for reading the tracks must be decreased. The problem of interference between the adjoining head cores sets a limit to the decrease of the head core intervals. It is therefore not possible to decrease the track intervals below the head core intervals.

Serpentine type magnetic tape devices are known wherein a head, having a multiplicity of head cores arranged in parallel in the direction of the width a tape, is moved in the direction of the width of the tape to solve this problem. The operation of such devices will be described with reference to FIG. 15.

First, as shown in FIG. 15, a plurality of head cores 14 are arranged at certain intervals in the direction of the width of a tape on a head 10. When a tape 3 travels in a forward direction 59 from its position where the head 10 contacts the beginning of the tape (BOT) 55, the head cores 14 record or read a first group of tracks 57. When the head 10 is brought into contact with the end of tape (EOT) 56, the head 10 is moved in a tape width direction 61. When the head cores 14 come to a position where they directly face a second group of tracks 58, the tape 3 is moved in a reverse direction 60 to record or read the second group of tracks 58. By increasing the number of such groups of tracks, recording and reading can be performed on more tracks without increasing the number of the head cores.

In such a device, information is continuously recorded, for example, by recording it on the first group of tracks from the beginning of the tape and, after the end of the tape is reached, recording it on the second group of tracks.

On the other hand, to read information, the tape is moved to position the head at an end of the tape when an instruction is given to indicate the track (target track) and the block (target block) where the information to be read is present. Next, positioning is performed to cause the head cores to face the target track having the data to read at the end of the tape, and then the tape is moved. Then, reading is performed when the target block comes to the head.

Such an operation to move the head cores from the track which currently faces the head cores to a position where they face the track specified for the next recording or reading operation (hereinafter referred to as a "target track") is referred to as a "track switching" operation. The operation of moving the head in the direction of the width of the tape for such a purpose is referred to as "head positioning".

Known conventional methods for positioning a head include the open loop control system employed in the device disclosed in Japanese unexamined patent publication No. S61-182621 wherein positioning is performed by driving the head using a stepping motor for movement by an amount corresponding to a predetermined number of pulses, and the closed loop control system employed in the device disclosed in Japanese unexamined patent publication No. H4-209310, wherein a servo track on the tape is used for such a purpose.

The open loop control system employed in most conventional devices does not monitor the actual position of the tape. Therefore, this system is disadvantageous not only in that it can not follow fluctuations of the positions of tracks caused by the meandering of the tape during its travel in devices having a high track density, but also in that it can not properly handle a positional shift of a tape which has been loaded.

In devices utilizing a servo track, a servo track having a predetermined signal recorded thereon is provided in parallel with data tracks and the signal is read by a servo head core (hereinafter also referred to as a "servo head") which faces the servo track. Positional deviation between the servo head and servo track is obtained from the magnitude of the output of the servo head.

Referring to the method for obtaining such a positional deviation, for example, when the servo head is in a position where it can read the entire width of the servo track, the output becomes maximum, which means that accurate positioning has been achieved. A shift of the servo track from such a position results in a decrease in the output because only a part of the width of the servo track can be read. Since the amount of the decrease in the output is in one-to-one correspondence with the positional deviation between the servo track and servo head, the detection of the output will give the positional deviation.

Referring to FIG. 15, by providing a servo head core 12 and head cores 14 for reading data on a single head 10, so that the servo head core 12 is positioned on a servo track 11 with the head cores 14 being positioned on a group of data tracks 57, the head cores 14 can be positioned on the group of data tracks 57 through the positioning the servo head 12.

If there are a plurality of groups of data tracks on which a head must be positioned, the same number of servo tracks are usually provided as the number of groups of data tracks, and a track switching operation is carried out by positioning them on the respective groups of data tracks in accordance with the above-described configuration of the head. Although the simplest configuration has been briefly described, there are various known methods for recording and processing signals on a servo track which basically obtain the positional deviation between the track and head core.

Further, in the case of devices capable of detecting the deviation between the positions of tracks on a tape and a head using a servo track or the like, Japanese unexamined patent publication No. H5-46961 indicates that the following operation of the head can be performed so as to maximize the signal output in data read write operation modes.

Although there are data and servo tracks, as described above, hereinafter the term "track" means a data track.

In serpentine type magnetic tape devices represented by the so-called QIC (quarter inch cartridge) type, as described above, the tape is dragged in the moving direction of the head due to friction between the surface of the head and the tape itself as a result of the track switching operation of the head, when the tape is stopped or moved at a low speed.

In conventional devices, however, it is some time before a target block is accessed after track switching because track switching is performed when the tape has been wound around the reel on either side almost entirely, i.e., at the beginning or end of the tape. This allows a shift of the tape to be naturally corrected to some degree as a result of the movement of the tape, and the time required for such correction has caused no problem. Furthermore, in conventional devices wherein the track density is low, even if some tape shift remains uncorrected, it creates no problem during data recording and reading operations.

In high density devices, however, recording and reading operations must be performed on any track of any block on a magnetic tape. In this case, it must be possible to perform the track switching operation in any position over the entire length of the tape. However, it is undesirable for such a tape shift, during head positioning, to prolong the time before the commencement of the recording and reading of information.

In addition, in conventional devices utilizing a servo track, although the relative positional deviation between the head core and track can be obtained, it is not possible to know where the head is located in the movable range of the head at this time. Specifically, information is not available on where the head is located in its movable range on an axis along the moving direction thereof. Therefore, the positioning operation using a servo track does not work when the tape moving speed is low or when the servo signal can not be read as a result of a decrease in the signal to noise ratio. This results in a problem in that the time before the recording and reading operations is prolonged because the positioning operation must be performed after the servo track becomes readable.

Such head position information can be regarded as the absolute position of the head, if it is defined as displacement from a reference position defined on the above-mentioned axis, and will therefore be referred to as the "absolute head position" to be differentiated from a deviated position.

SUMMARY OF THE INVENTION

It is a first object of the invention to provide a magnetic tape device wherein the effect of friction between the tape and head can be eliminated so as to allow highly accurate positioning of the head.

It is a second object of the invention to provide a magnetic tape device wherein highly accurate head positioning can be performed even if the servo track is unreadable and, further, to provide a magnetic tape device wherein the time required for head positioning can be reduced to allow faster data recording and reading.

The present invention solves the above-described problems as follows.

According to a first aspect of the invention, in a magnetic tape device wherein a servo signal on a servo track provided on a magnetic tape is read and a magnetic recording/reading head (hereinafter referred to as a "magnetic head") having one or more head cores is moved in the direction of the width of the tape to position the head cores on predetermined data tracks, there is provided a positioning control portion for controlling the positioning of the magnetic head so that it moves between different data tracks in the direction of the width of the tape, which is moving at a speed equal to or higher than a predetermined value greater than zero.

According to a second aspect of the invention, in a magnetic tape device wherein a servo signal on a servo track provided on a magnetic tape is read and a magnetic head having one or more head cores is moved in the direction of the width of the tape to position the head cores on predetermined data tracks, there is provided a positioning control portion for controlling the positioning of the magnetic head and a friction reducing means for keeping the magnetic tape apart from the magnetic head when the magnetic head is moved between data tracks by the positioning control portion.

According to a third aspect of the invention, in the device according to the second aspect of the invention, the friction reducing means includes bar-shaped members which are provided before and after the magnetic head, when viewed in the longitudinal direction of the magnetic tape, and whose longitudinal direction corresponds to the direction of the width of the magnetic tape, and a driving means for translating the bar-shaped members into a first state wherein the longitudinal sides of the bar-shaped members are put in contact with the magnetic tape to move the magnetic tape in a direction away from the magnetic head and into a second state wherein the magnetic tape and the above-mentioned sides of the bar-shaped members are not in contact.

According to a fourth aspect of the invention, in the device according to the second aspect of the invention, the friction reducing means includes bar-shaped members which are provided before and after the magnetic head, when viewed in the longitudinal direction of the magnetic tape, and whose longitudinal direction corresponds to the direction of the width of the magnetic tape, and a driving means for tilting or rotating the bar-shaped members into a first state wherein the bar-shaped members are not in contact with the magnetic tape and into a second state wherein the longitudinal direction of the bar-shaped members is tilted about an axis parallel with the longitudinal direction of the magnetic tape to put the sides of the bar-shaped members in contact with the magnetic tape so that the magnetic tape is partially or entirely kept apart from the magnetic head.

According to a fifth aspect of the invention, in the device according to the second aspect of the invention, the friction reducing means includes a moving portion for moving the magnetic head, so that a surface thereof, which slides on the magnetic tape, is moved away from the magnetic tape, and a driving means for moving the moving portion.

According to a sixth aspect of the invention, in the device according to the second aspect of the invention, the friction reducing means includes at least one hole, provided on the surface of the magnetic head which slides on the magnetic tape or in the vicinity of the sliding surface, for allowing gas to flow toward the magnetic tape, an introduction means for introducing the gas into the hole, a choking means for choking the flow of the gas through the introduction means, and a means for pressurizing the gas to allow the gas to cause the magnetic tape to move away from the sliding surface of the magnetic head.

According to a seventh aspect of the invention, in a device according to the first aspect of the invention, a guide may be provided on the magnetic head, which is put in contact with the magnetic tape in the direction of the width thereof for regulating the movement of the magnetic tape in the direction of the width thereof.

According to an eighth aspect of the invention, in a device according to the fifth aspect of the invention, the driving means is driven by superimposing a signal, which fluctuates at a predetermined frequency, on a movement signal supplied to the driving means.

According to a ninth aspect of the invention, in a magnetic tape device wherein a servo signal on a servo track provided on a magnetic tape is read and a magnetic head having one or more head cores is moved in the direction of the width of the tape to position the head cores on predetermined data tracks, there is provided a positioning control portion for controlling the positioning of the magnetic head, and the movement of the magnetic head between the data tracks caused by the positioning control portion is performed by vibrating the magnetic head with a signal, which fluctuates at a predetermined frequency, superimposed on a movement signal supplied to the magnetic head.

According to a tenth aspect of the invention, in a magnetic tape device wherein a magnetic head is positioned in the direction of the width of a magnetic tape, there is provided a contact-vibration means, which contacts an end of the magnetic tape in the direction of the width thereof or a surface of the magnetic tape, and which vibrates the magnetic tape in the direction of the width thereof or in an out-of-plane direction, a driving means for moving the contact-vibration means so that it is put into contact with and moved away from the magnetic tape, and a control portion for controlling the driving means so that it moves the contact-vibration means to a position where it contacts the magnetic tape when the moving speed of the magnetic tape is higher than zero and equal to or lower than a predetermined value.

According to an eleventh aspect of the invention, in a magnetic tape device which includes a moving means for moving a magnetic head having one or more head cores in the direction of the width of a magnetic tape, a servo signal reading means for reading a servo signal from a servo track provided on the magnetic tape, a means for obtaining the deviation between a data track provided on the magnetic tape and the head core from the servo signal read by the servo signal reading means, a first command signal generation means for generating a drive command signal which nullifies the deviation, and a driving means for driving the magnetic head according to the drive command signal and wherein the head cores of the magnetic head are positioned on the data track on the magnetic tape; and, there is further provided a displacement detection means for detecting the displacement of the magnetic head from a reference position preset on an axis in the moving direction of the magnetic tape and for outputting a displacement signal, a means for storing the displacement signal obtained by the displacement detection means as an absolute position from the reference position serving as the origin, a means for associating the position of the data track on the magnetic tape with the absolute position based on the servo signal, a second command signal generation means for generating a magnetic head drive command signal which nullifies a signal representative of a deviation between the absolute position of the data track associated by the associating means and the position of the magnetic head, and a signal switching means for switching the signals from the first command signal generation means and the second command signal generation means supplied to the head driving means.

According to a twelfth aspect of the invention, in a magnetic tape device which includes a tension retaining means for retaining the tension of a magnetic tape at a preset constant value and wherein a magnetic head is positioned in the direction of the width of the magnetic tape, there is provided a tension storing means for storing a preset reference tension value serving as a reference for the tension of the magnetic tape and one or more preset tension values which are smaller than that, and a tension selection means for supplying the preset tension value which is smaller than the preset reference tension value to the tension retaining means, if the moving speed of the magnetic tape is higher than zero and equal to or lower than a predetermined value, and supplying the preset reference tension value, if the speed of the magnetic tape is higher than the predetermined value or if the magnetic head is not moved in the direction of the width of the magnetic tape.

The following methods for controlling a magnetic tape device are provided in order to achieve the aforementioned objects.

According to a thirteenth aspect of the invention, in a method of controlling a magnetic tape device comprising a first method of control wherein there is provided a moving means for moving a magnetic head having one or more head cores in the direction of the width of a magnetic tape and wherein a servo signal is read from a servo track provided on the magnetic tape; a deviation between a data track provided on the magnetic tape and the head core is obtained from the servo signal; and the magnetic head is driven so as to nullify the deviation; and, a second method of control is further provided wherein the displacement of the magnetic head from a reference position set in the moving direction of the magnetic head is detected; the displacement of the magnetic head is stored as an absolute position from the reference position serving as the origin; the position of the data track on the magnetic tape is associated with the absolute position based on the servo signal; and the magnetic head is driven so as to nullify a signal representative of a deviation between the absolute position of the data track and the position of the magnetic head.

According to a fourteenth aspect of the invention, in the method according to the thirteenth aspect of the invention, the first method of control is used when the servo signal can be read from the servo track and the second method of control is used when no valid servo signal can be obtained.

According to a fifteenth aspect of the invention, in the method according to the thirteenth aspect of the invention, the second method of control is first used to drive the magnetic head so as to nullify the signal representative of a deviation between the absolute position associated with the position of the data track and the magnetic head using the absolute position of the head; and, immediately before recording or reading is started after the positioning to the target data block specified on the magnetic tape is substantially finished, the control method is switched to the first method, wherein the magnetic head is driven by a drive command signal which nullifies the positional deviation between the data track and the magnetic head obtained from the servo signal.

According to a sixteenth aspect of the invention, in the method according to the fifteenth aspect of the invention, the driving of the magnetic head using the first and second methods of control is performed during the positioning of the magnetic head at the target data block specified on the magnetic tape.

According to a seventeenth aspect of the invention, there is provided a method of controlling a magnetic tape device, which includes a moving means for moving a magnetic head having one or more head cores in the direction of the width of a magnetic tape, and wherein a servo signal is read from a servo track provided on the magnetic tape to position the magnetic head in the direction of the width of the magnetic head, characterized in that the magnetic head is coarsely positioned in the vicinity of a target track during the repositioning of the magnetic head to the magnetic tape, and an operation of following up the target track is started immediately before a recording or reading operation is started on the target track specified on the magnetic tape.

According to an eighteenth aspect of the invention, in the method of controlling a magnetic tape device wherein a magnetic head is positioned in the direction of the width of a magnetic tape according to a servo signal obtained from a servo track on the magnetic tape, during a track switching operation, the magnetic head is reciprocated in the vicinity of a target track after the magnetic head is coarsely positioned in the vicinity of the target track and, thereafter, the track is followed up.

According to a nineteenth aspect of the invention, in the method of controlling a magnetic tape device, wherein a magnetic head is positioned in the direction of the width of a magnetic tape, according to a servo signal obtained from a servo track on the magnetic tape, during a track switching operation, the movement of the magnetic head to a target track from the track to which the magnetic head has been positioned includes one or more reciprocating operations in the direction of the width of the magnetic tape.

According to a twentieth aspect of the invention, in the method of controlling a magnetic tape device, which includes a tension retaining means for retaining the tension of a magnetic tape at a preset constant value, and wherein a magnetic head is positioned in the direction of the width of the magnetic tape, a preset reference tension value serving as a reference for the tension of the magnetic tape and one or more preset tension values which is smaller than that are stored, and the tension of the magnetic tape is retained during the movement of the magnetic head in the direction of the width of the magnetic tape by supplying the tension retaining means with a preset tension value which is smaller than the preset reference tension value, when the moving speed of the magnetic tape is higher than zero and equal to or lower than a predetermined value, and by supplying the tension retaining means with the preset reference value, when the speed of the magnetic tape is higher than the predetermined value or when the magnetic tape is not moved in the direction of the width of the magnetic tape.

The means for reducing a frictional force between the surfaces of a magnetic tape and a magnetic head by moving the tape away from the head or moving the head away from the tape during a head positioning operation reduces the frictional force to prevent the tape from being dragged by the head, by reducing the contact force between the surfaces of the head and tape or by reducing the frictional coefficient.

There are several means for separating a tape and a head.

For example, tape guide pins movable perpendicularly to the surface of the tape may be provided before and after the head. The friction between the tape and head can be reduced by moving the guide pins in a direction such that the tape is moved away from the surface of the head while the head is being driven.

There is another method wherein air is blown from a nozzle provided inside or in the vicinity of the sliding surface between the head and tape to float the tape while the head is being driven.

Further, the same affect can be achieved by allowing the head itself to move in a direction perpendicular to the surface of the tape.

The contact force between the tape and head originates in a component in an out-of-plane direction of the tension of the tape which is a force in the in-plane direction of the tape produced when the tape is wrapped around the head. Therefore, a temporary decrease in the tension of the tape also reduces the contact force, which results in a decrease in the frictional force.

Further, a decrease in the friction coefficients or the surfaces of the tape and head also reduces the frictional force therebetween, which provides the same effect. The vibration of the surface of the head which slides on the tape at a predetermined frequency results in a decrease in the frictional coefficients, which allows the amount of the tape dragged by the head to be reduced.

Further, as shown in FIG. 14, the amount of the tape dragged by the head decreases as the tape speed increases and stops decreasing when a sufficiently small amount is reached at a certain speed $V0$. The speed $V0$ varies depending on the tension of the tape, the interval between regulating means provided before and after the head in the longitudinal direction thereof for suppressing the meandering of the tape in the direction of the width thereof, i.e., the length of the tape, and the friction between the surfaces of the tape and the head.

Since the amount of tape shift at a tape speed of $V0$ or more is sufficiently small relative to the displacement of the head, the dragging of the tape becomes almost negligible when track switching has almost been completed, at which time the head displacement has become small. Therefore, the first object of the invention is achieved by suppressing tape shift using the method of controlling the driving of the head, wherein the head is not moved in the direction of the tape width when the tape is not moving or when the tape speed is $V0$ or less.

Further, as the head is moved, the tape is shifted in the same direction as the head. By reciprocating the head so that the moving direction of the head is temporarily changed during a track switching operation, the frictional state can be changed to allow for the correction of the tape position, which has been shifted by friction during the movement of the tape. Thus, highly accurate positioning can be performed and the first object of the invention is thereby achieved.

Especially, if the method of controlling the driving of a head wherein the head is reciprocated in the vicinity of a target track is used after the head is coarsely positioned in the vicinity of the target track, the position of the target track can be accurately identified by associating the output of a servo signal and the head position during the reciprocating operation. This makes it possible to position a head core at the center of the target track more accurately, thereby achieving the first object of the invention.

The guides provided in close proximity to the head stop the ends of the tape in the direction of the width thereof, thereby regulating the lateral movement of the tape. This reduces the amount of the tape dragged by the head.

In a magnetic tape device having a means which allows for movement of the magnetic head in the direction of the width of a magnetic tape, the first control command signal generation means calculates a deviation between a track and a head core from a servo signal obtained from a servo track provided on the tape by means of the servo signal reading means and generates a drive command signal which nullifies the deviation.

Meanwhile, the absolute displacement storing means stores a signal from the head displacement detection means, which signal is representative of the displacement of the magnetic head from a predetermined reference position as an absolute position. As a result, there is generated a virtual coordinate system for the absolute position of the head wherein the reference position serves as the origin.

By associating the position of a data track on the tape with the position in this absolute position coordinate system using the above-described servo signal, it is possible to detect the position of the data track by referring to the absolute position coordinate system thus generated.

Then, the second control command signal generation means generates a head drive command signal which nullifies a signal representative of a deviation between the absolute position of the data track and the absolute position of the head, which is always supplied by the head displacement detection means.

The signal switching means switches the signals from the first and second command signal generation means to be supplied to the head driving means in accordance with rules for switching according to the control method of the invention.

The head driving means drives the head based on signals supplied thereto to position the head core to a target track, thereby achieving the second object of the invention.

At this time, the command signal switching means selects the signal from the first drive command signal generation means to enable the first method of control, thereby accurately positioning the track and the head core if the servo signal from the servo track can be read. If no valid servo signal can be obtained, it selects the signal from the second drive command signal generation means to enable the second method of control, thereby performing coarse positioning of the head core to the target track.

The control method, as described above, allows positioning whether the servo track on the tape can be read or not. The time required for track switching will not be increased even if the above-described means for correcting tape shift due to friction is used to achieve the first object of the invention.

Further, in a magnetic tape device having the above-described means, the second object of the invention is achieved by the method of controlling the driving of the head, wherein the signal from the first control command signal generation means is selected during the repositioning of the head to a target block on the tape by the tape driving means and the signal is switched to the signal from the second control command signal generation means immediately before recording or reading is started, when the repositioning to the target block has been almost completed. This is because this control method allows track switching to be completed during the time required for repositioning the block on the tape at the head.

DESCRIPTION OF THE PREFERRED EMBODIMENTS

Figure 17:
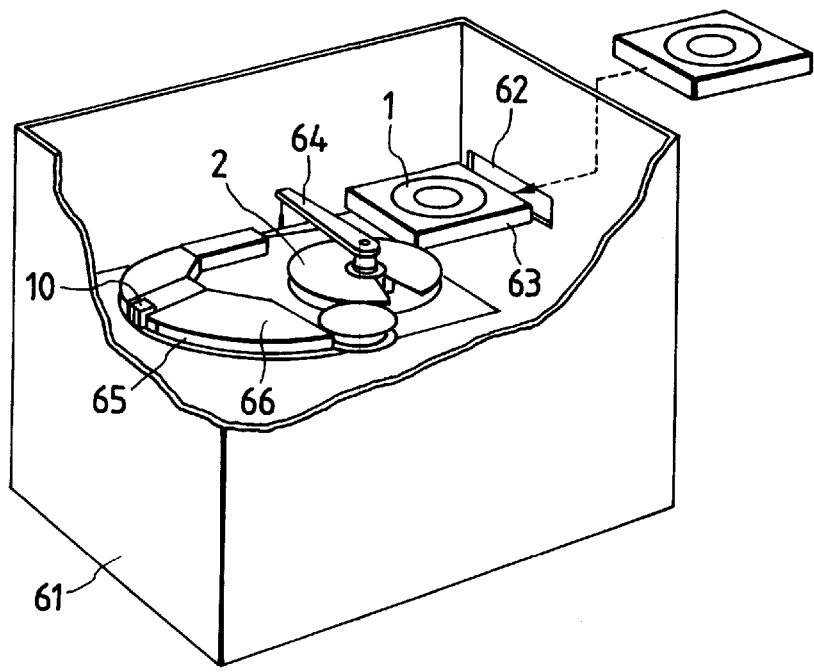
FIG. 17 is a schematic perspective view of a magnetic tape device to which the present invention is applied.

FIG. 17 shows a schematic view of a magnetic tape device provided in accordance with the invention, which is mainly used for data back-up in a computer.

This magnetic tape device has a cartridge insertion hole 62 provided in a part of a housing 61, and a cartridge 63 containing a magnetic tape (e.g., a ½ inch tape) is inserted into the insertion hole 62.

Upon the insertion of the cartridge 63, a loading arm 64 pulls out the tape, routes it along a tape guide surface 65, operating on the principle of a hydrostatic air bearing, formed on a tape guide 66, and couples the leading end thereof with a machine reel 2. Thus, a tape moving system is formed.

The tape is wound around a file reel 1 provided in the cartridge, which can be externally driven for rotation. The tape travels between the file reel 1 and the machine reel 2.

A magnetic head 10 is provided in an area along the tape guide surface 65 of the tape guide 66 so that it faces a recording surface of the tape. Further, means is provided so that the magnetic head 10 can be moved in the direction of the width of the tape.

Figure 2:
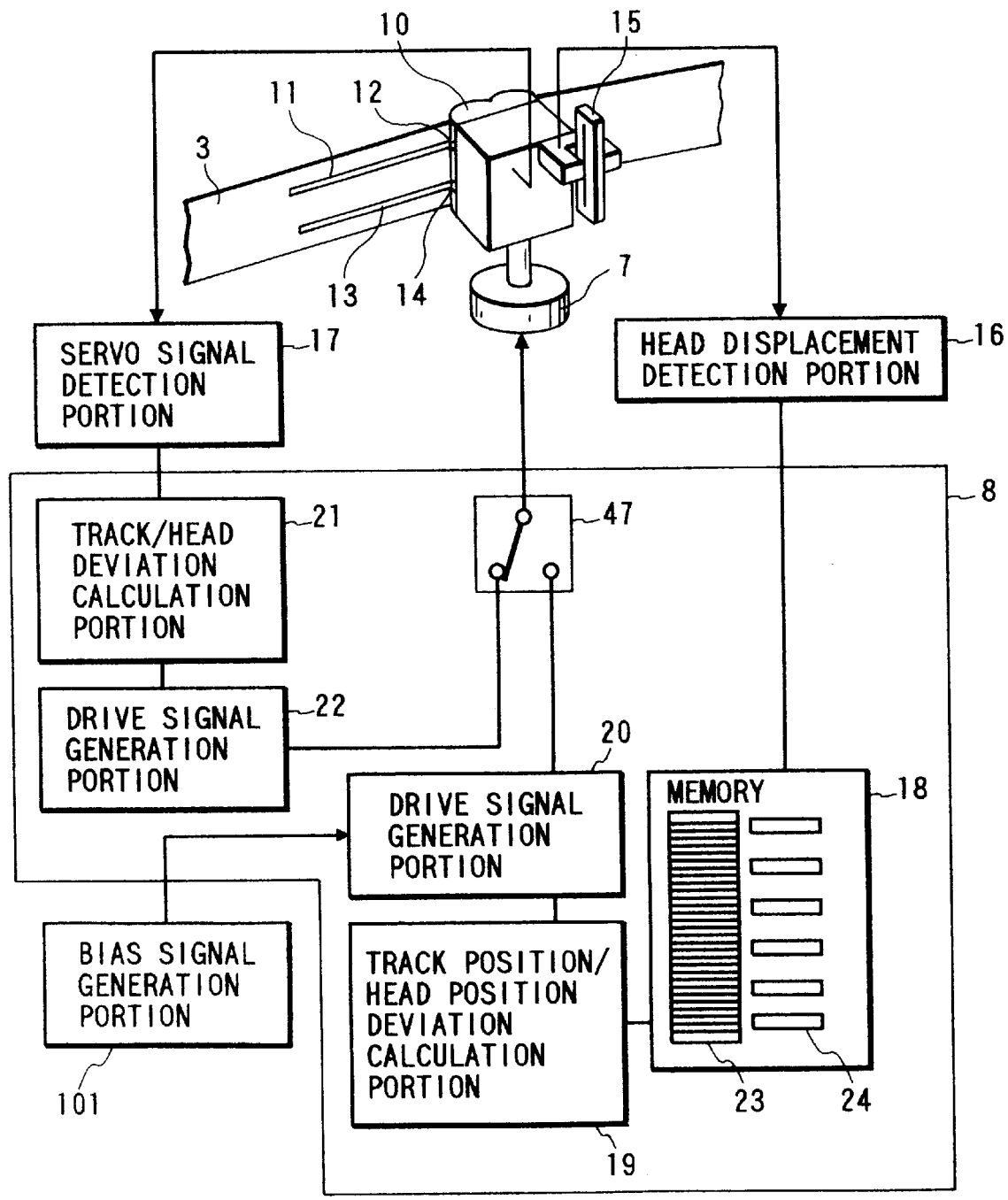
FIG. 2 is a diagram of a detailed configuration of a head moving mechanism of the magnetic tape device of the first embodiment.
Figure 3:
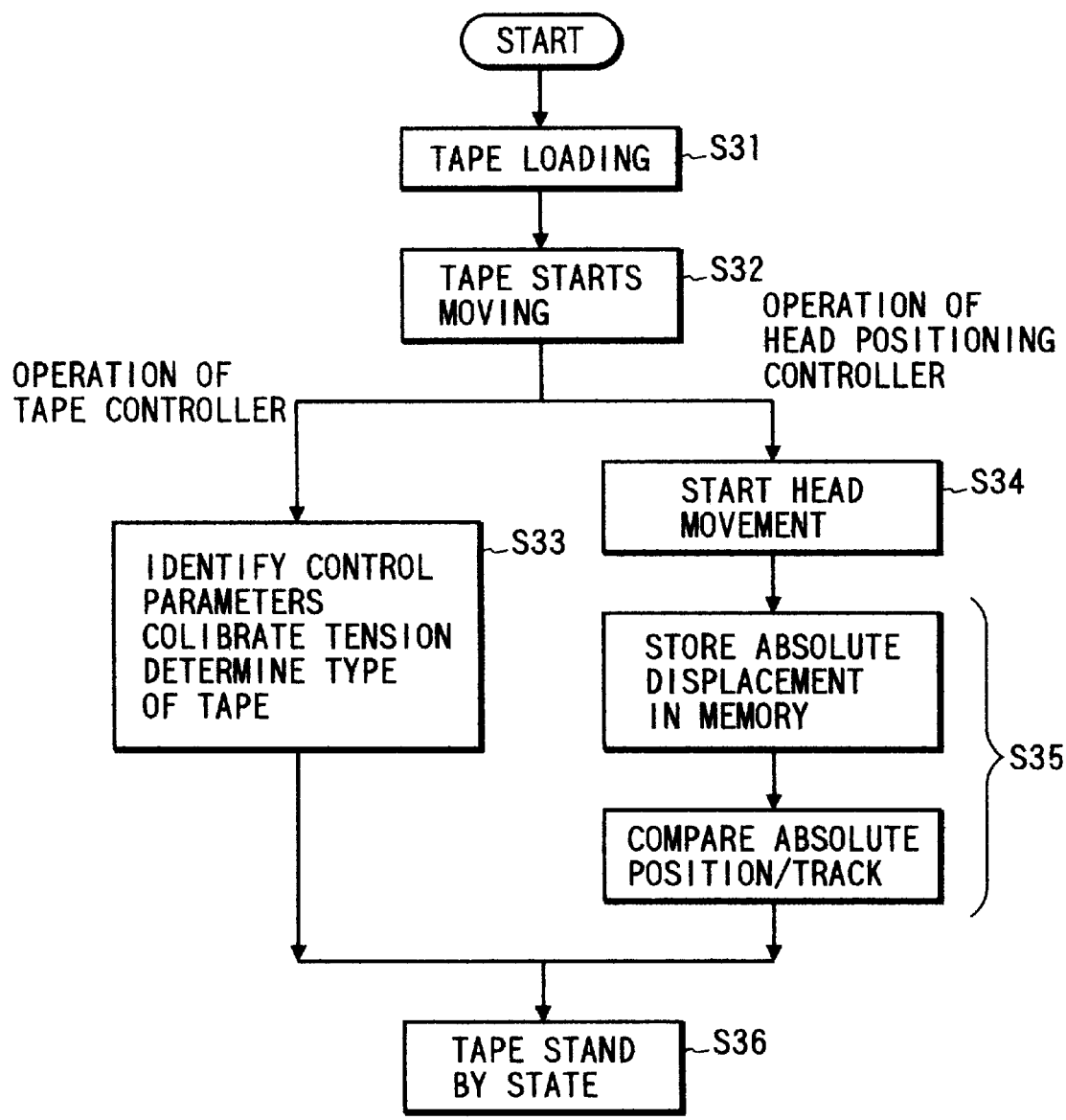
FIG. 3 is a flow chart showing the steps of an operation during the loading of a tape to the magnetic tape device in the first embodiment.

A first embodiment of a magnetic tape device in accordance with the present invention will now be described with reference to FIGS. 1 through 3.

Figure 1:
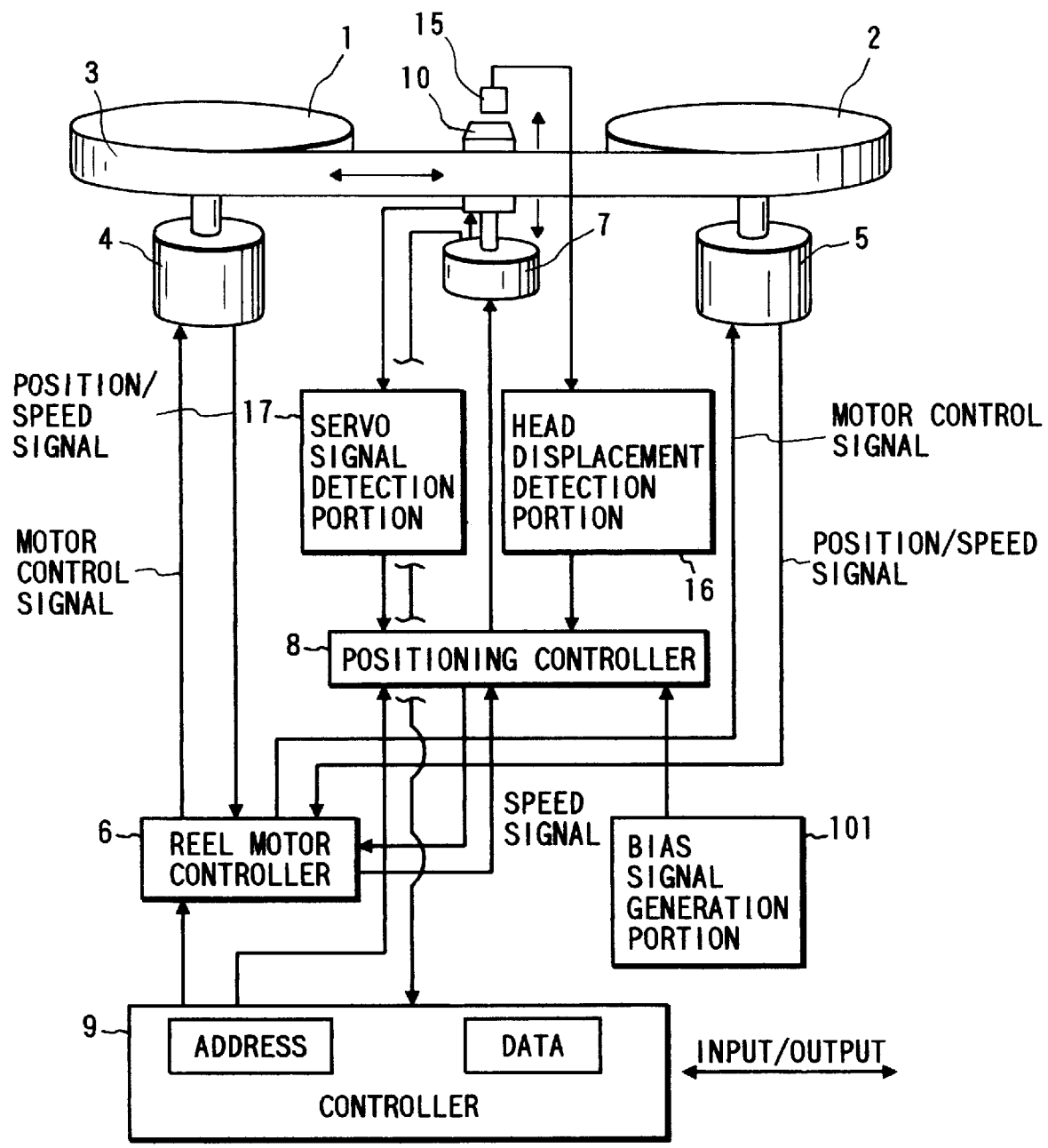
FIG. 1 is a diagrammatic representation of a magnetic tape device forming a first embodiment of the invention.

FIG. 1 shows the configuration of a magnetic tape device forming of the first embodiment of the invention. This view shows a tape driving system and a head driving system of the device for the device shown in FIG. 17. FIG. 2 shows a more detailed configuration of the head driving system of FIG. 1, including details of a control system for the same.

The magnetic tape device of the present invention is constituted by a tape moving system including tape drive motors 4 and 5, a reel motor controller 6 for controlling the same, a mechanical system for head positioning, a controller 8 for controlling the movement of the head 10, and a controller 9 for adjusting the timing of the foregoing components and for performing data input/output. The data is exchanged between the controller 9 and the head 10.

The reel motor controller 6 detects the position and speed of the servo motors 4, 5 for rotating the file reel 1 and the machine reel 2, respectively, obtains an input for controlling the motors from the position and speed and predetermined patterns of speed, drives those motors to move the tape 3, and performs the positioning of a target recording block on the tape 3. It also controls the tension of the tape 3, simultaneously.

The head 10 records and/or reads the data on a predetermined track and is moved in the direction of the width of the tape by a linear actuator 7, as needed. The head 10 has two curved portions extending in the longitudinal direction of the tape, which portions allow proper switching of the tape moving direction between the forward and reverse directions.

In the conventional device, a servo track 11 provided on the tape 3 is read by a servo head 12 on the head 10 to provide a servo signal detection portion 17 with a servo signal. In the positioning controller 8, a positional deviation between a data track 13 and a head core 14 is calculated in a deviation calculation portion 21; a drive control signal for positioning the head core 14 at the data track 13 by driving the head 10 is generated by a drive signal generation portion 22 based on the positional deviation; and the drive control signal is input to the actuator 7.

There are several known methods usable for obtaining the servo signal that gives the positional deviation between the track 13 and the head core 14, such as the method disclosed in Japanese unexamined patent publication No. H6-195063. However, the details of such methods are not essential to the description of the invention and will not be discussed here.

The device of the present embodiment further includes a head position detection means 15 connected to a head displacement detection a portion 16, which detects the displacement of the magnetic head from a reference position preset on an axis in the moving direction of the head and inputs a displacement signal to the positioning controller 8. The positioning controller 8 incorporates a memory 18 for storing the displacement signal as an absolute position from the reference position serving as the origin.

The positioning controller 8 further includes a deviation calculation portion 19 for calculating a deviation between the positions of the head and a target track with reference to the head displacement information stored in the memory 18 and a drive signal generation portion 20 for generating a drive control signal supplied to the actuator 7.

The positioning controller 8 further includes a signal switching portion 47 for switching the output of a drive signal generation portion 22 for generating a drive control signal from the servo loop and the output of the drive signal generation portion 20 for generating a drive control signal from absolute position information, which signals are sent to the actuator 7.

The details of various forms of the head position detection means 15 will be described later with reference to FIGS. 12 and 13.

The controller 9 supplies the address of the data to be recorded and/or read to reel motor controller 6 and to the positioning controller 8 and controls the timing of recording and/or reading. Here, an "address" means a position on a tape where recording is to be performed or where data is present and is represented by a block in the longitudinal direction of the tape and by a track in the direction of the width of the tape.

The steps of the operation of this device will now be described in the order of occurrence.

Upon the power-up of the device, the positioning controller 8 supplies a constant drive input to the actuator 7 to move the head 10 at a constant speed throughout the movable range thereof. The output of the head displacement detection portion 16 at this time is fetched at predetermined intervals and is stored in the memory 18 as data to generate an absolute position coordinate system of a virtual head whose origin is a reference position.

For example, the reference position can be set at one end of the movable range if the movement of the head is started at that end. Such a reference position may be set at any position on an axis extending in the moving direction of the head. Therefore, for example, the reference point may be set in a position at the same elevation as a reference plane for tape movement defined during the manufacture of a tape movement path or in a position at the center of the tape movement path or in any other convenient position.

Next, a description will be the made of the flow of the operation of the device upon the insertion of a tape cartridge and the loading of the tape 3. Upon the loading of the tape 3 (step 31), the controller 6 for controlling the tape moving system moves the tape 3 a predetermined distance to identify parameters for control, such as tension control (step 32), to determine the type of the tape (step 33). At this time, the head 10 is moved in the direction of the width of the tape (step 34) while the tape 3 is being moved at a steady speed so that the servo track 11 thereon can be read. A servo signal obtained at this time and a signal from the head displacement detection portion 16 are compared to calibrate the correspondence between data 24 indicating the position of the track 13 on the tape 3 and head absolute position data 23 (step 35). Such calibration allows the position of the track 13 to be detected solely by referring to the absolute position 24 of the target track thereafter. After the completion of those operations, the tape device enters a tape standby state (step 36) wherein it waits for an operational command.

The above-described operations are commonly performed in other embodiments of the invention to be described later.

Figure 4:
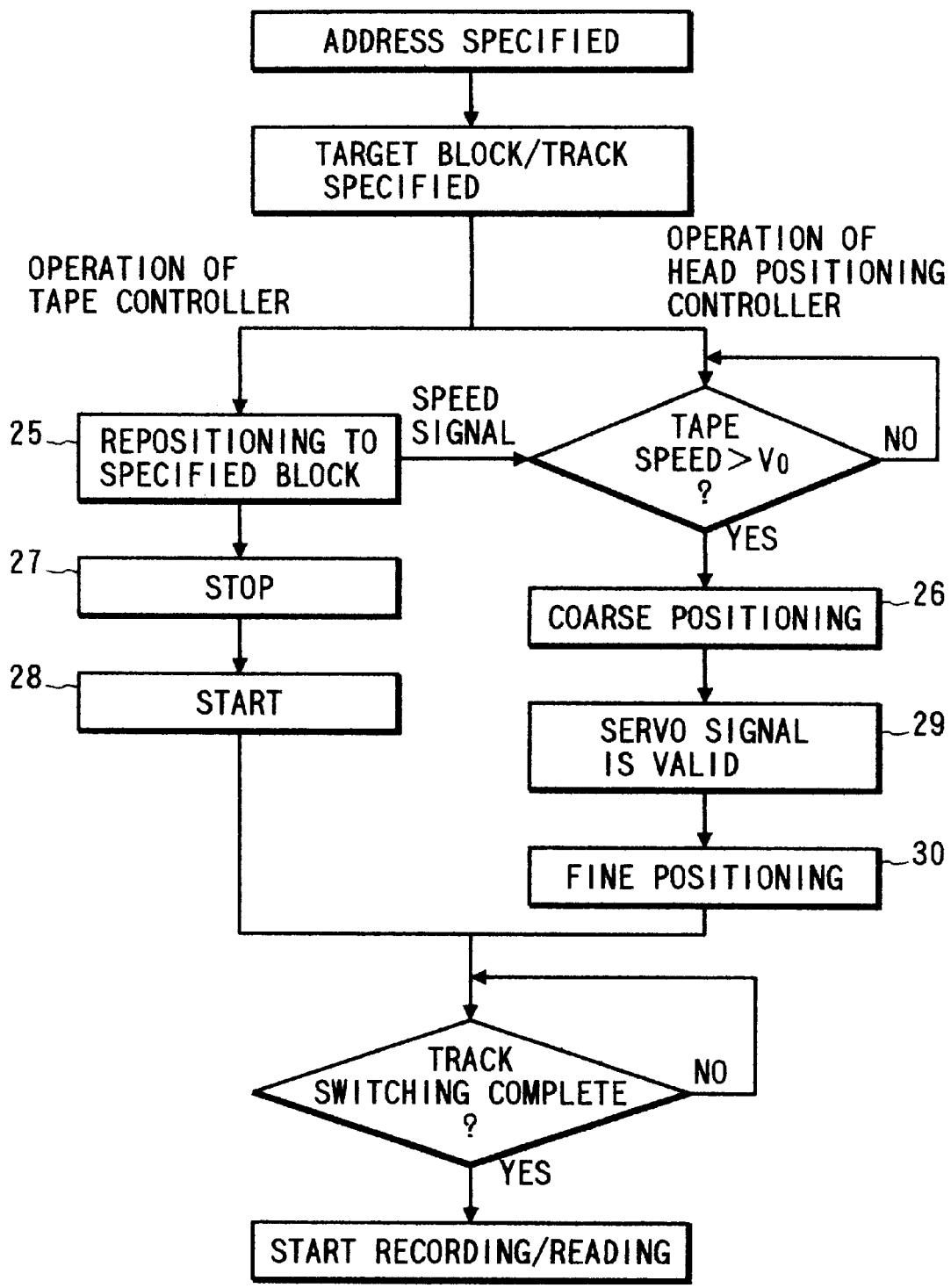
FIG. 4 is a flow chart showing the steps of an operation of a magnetic tape device of the invention performed in response to a record or read command with a limit placed on the tape speed.
Figure 5:
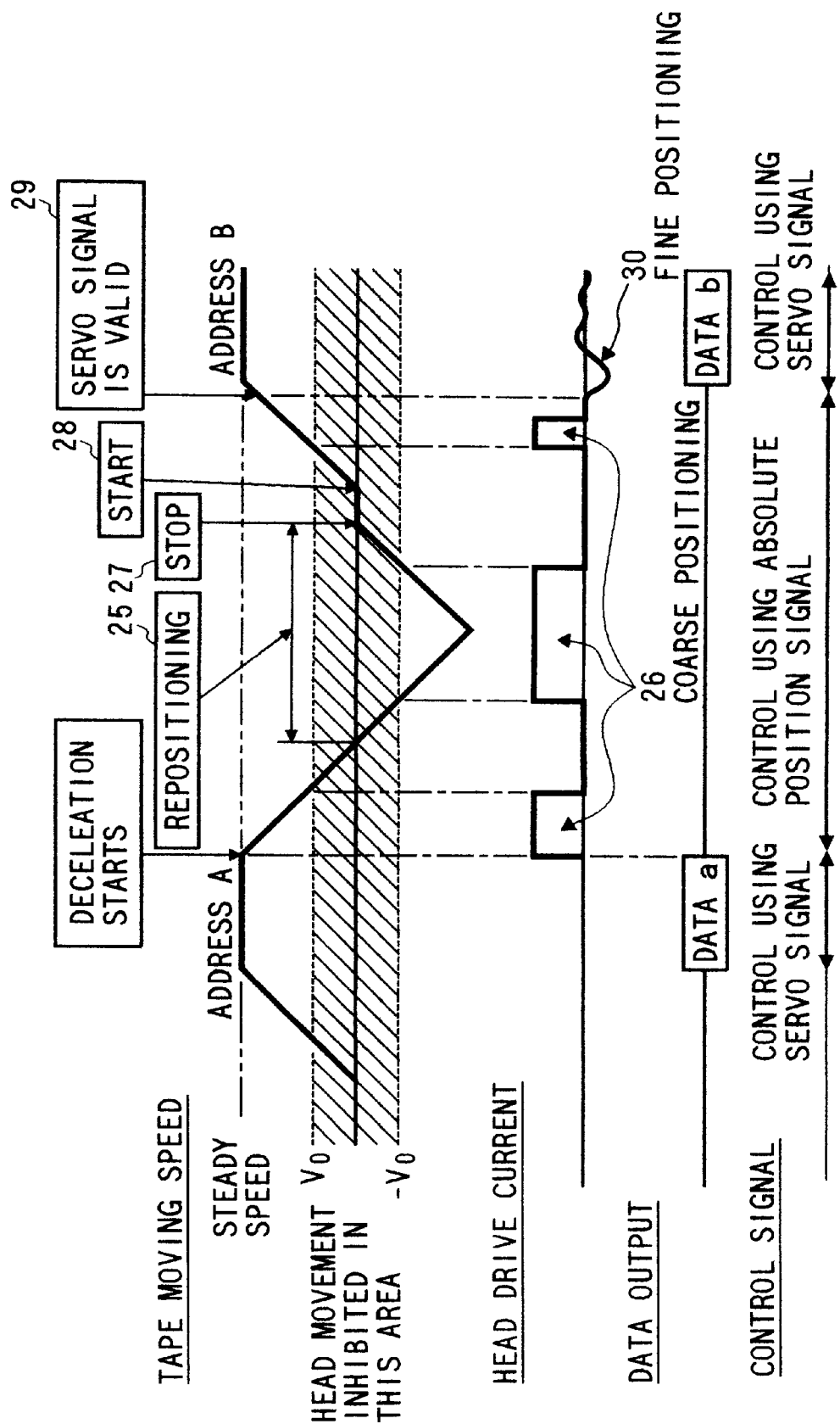
FIG. 5 is a timing diagram for the operation shown in FIG. 4.

In accordance with the invention, a device will now be described which is limited in that the tape is not moved at a speed equal to or lower than a predetermined tape speed. The structure of the device of this embodiment is the same as that in the first embodiment, except for the area of the head. FIG. 4 shows the operation of this device in response to a command for data recording or reading. FIG. 5 shows a time chart illustrating this operation.

In the illustration of the tape moving speed in FIG. 5, the speed of the tape in one of its moving directions is shown as the speed in a positive direction. In the following description, the speed represented by "speed V0" is the absolute value of the tape speed which applies to both moving directions of the tape.

The operations of reading data a and b from addresses A and B, respectively, will be described in order. The operations of the tape moving system and the head driving system will be the same for the recording of data. Further, although the addresses A and B will be described as being for consecutive blocks, generally speaking, they do not necessarily relate to consecutive blocks.

First, let us assume that positioning at the address A has already been finished and the data a is being read. Then, the address B where the next data b is stored is supplied to the main controller. This address identifies the block and track as the target for repositioning.

When the reading of the data a is complete, the reel motor controller 6 performs a repositioning operation (step 25) on the specified block. At this time, as the tape starts to decelerate, the head positioning controller 8 starts to move the head 10 to perform coarse positioning (step 26) of the head 10. In doing so, it continually receives a signal representative of the speed of the tape 3 from the reel motor controller 6 and stops the head moving operation when the tape speed decreases below the speed V0.

Repositioning refers to the following operation. When the head faces the target block containing the data to be read, the data can not be read unless the tape is in a steady moving state. Therefore, the tape must be started when the head faces a position on the tape ahead of the target block, in the moving direction of the tape, by the distance traveled by the tape before it enters the steady moving state. Such an operation of moving the tape to cause the head to face the target block is referred to as a tape repositioning operation.

However, if the tape speed becomes V0 or more during the repositioning operation, the head moving operation which has been stopped is resumed.

During the coarse positioning (step 26) of the head, the positioning controller 8 generates a control command signal which nullifies a deviation of the head position 24 from the absolute position associated with the target track when the tape is loaded based on a signal indicating the absolute position of the head sent by the head displacement detection portion 16 and sends the control command signal as a command current to the linear actuator 7.

Such a method wherein head positioning is controlled based on an absolute position signal is suitable for a tape device of high track density because it provides an accuracy higher than that available in conventional methods wherein positioning is performed on an open-control basis by supplying a predetermined pulse to a stepping motor.

After the repositioning operation (step 25), the tape is temporarily stopped (step 27) to check whether other portions of the system are ready to accept the next data and, thereafter, the movement of the tape to the target block is started (step 28). When the tape speed has become V0 or more, the device is in a standby state until the servo signal from the servo track 11 becomes readable, if the above-described coarse positioning (step 26) has been completed. If the coarse positioning (step 26) has not been completed, the device enters the standby state after performing the coarse positioning 26 of the head based on the signal from the head displacement detection portion 16.

The operation of reading the servo signal from the servo signal detection portion 17 is continued even in the above-described operation and, if the servo signal output exceeds a predefined value and is determined to be valid (step 29), the switching portion 47 switches from control using the absolute position signal to control using the servo signal to enable fine positioning (step 30) wherein the deviation between the track 13 on the tape and the head core 14 is nullified based on the servo signal.

Figure 6:
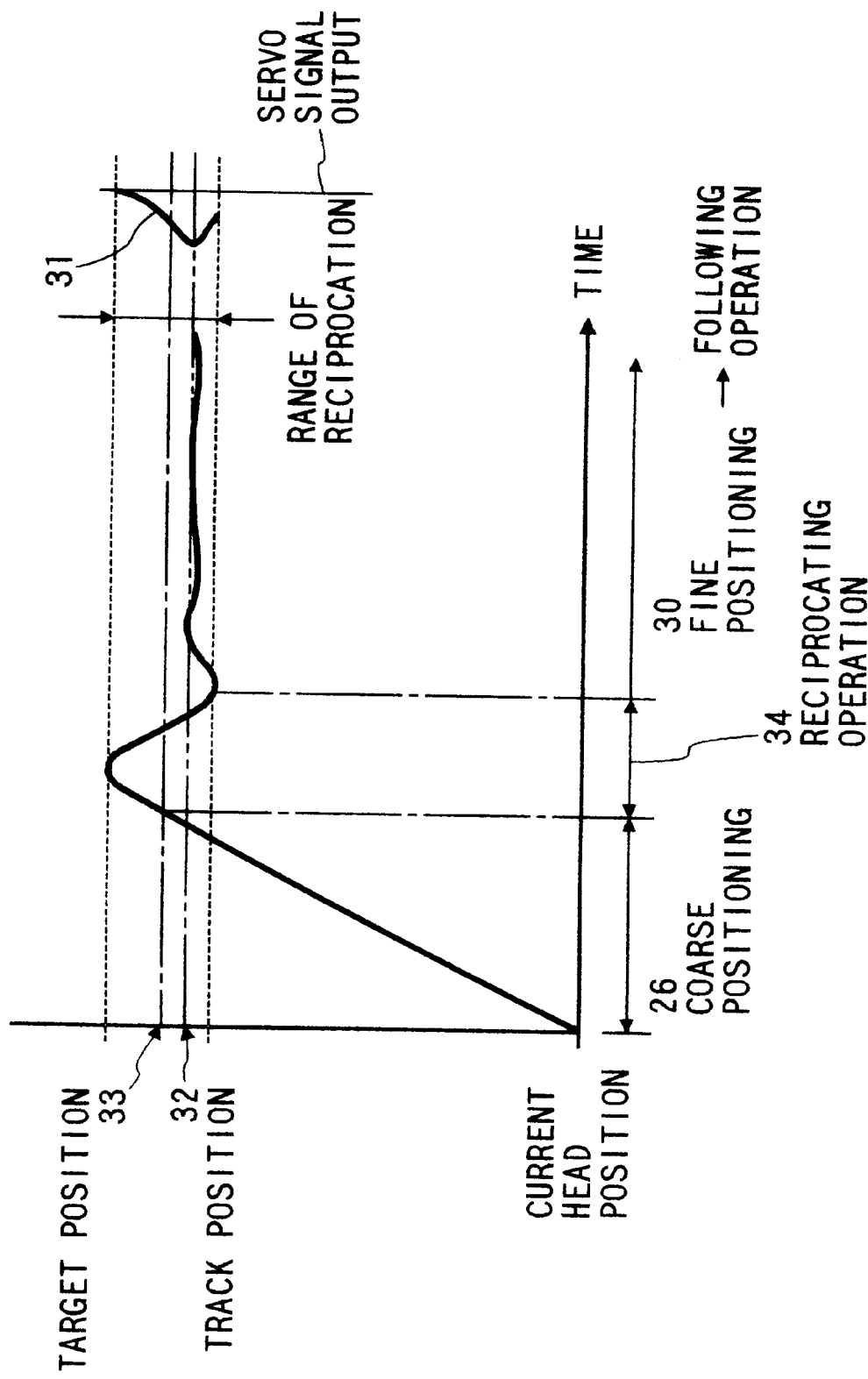
FIG. 6 is a position diagram showing the operation of a head of the magnetic tape device of the invention during the positioning of the head.

At this time, as shown in FIG. 6, the head is first reciprocated (step 34) in the vicinity of a target track position 33 to find the position where the servo signal output is the maximum, i.e., a true track position 32. This simultaneously changes the frictional state between the surfaces of the head and tape at the same time, thereby reducing the tape shift. It is thus possible to correct the tape position which has been shifted due to friction and to perform highly accurate positioning at the correct track position on the tape.

If the deviation between the target track and head has been reduced below a certain value as a result of the positioning using the servo signal, it is judged that track switching has been completed and data reading is started. The interval between the commencement of the positioning and the commencement of the reading must be in the period between the time when the servo signal becomes readable and the time when the target block is reached. The device of the present embodiment can easily meet this requirement because it actually involves only movement of the head by a small amount of displacement for fine positioning.

It is desirable that this positioning control system using a servo signal continually works during data reading so as to follow the meandering of the tape, thereby allowing the signal to be read at the maximum output level. In practice, the following operation is the same as the fine positioning.

Although the above-described reciprocating operation is performed when the coarse positioning of the head is completed in the present embodiment, it is possible to employ a control method wherein a head drive signal is generated to cause the reciprocating operation to change the frictional state between the surfaces of the head and the tape during the movement of the head for coarse positioning. For this purpose, a configuration may be employed wherein a signal which is able to cause the reciprocating operation is supplied to the drive signal generation portion 20 in advance and is superimposed on the drive signal generated on the basis of the information from the deviation calculation portion 19 during the head movement. With such a configuration, the frictional state can be changed before the amount of drag of the tape increases to reduce the tape shift.

Since the head displacement detection portion 16 sends the head absolute position signal to the controller 8 even when the positioning system using the servo signal is in operation, the calibration of the position of the track 13 and the absolute position 24 as performed at the time of the loading of the tape can be repeated at this stage. This further increases the accuracy of the coarse positioning and further reduces the time spent before the fine positioning using the servo signal can be started.

Further, even if the servo signal can not be read for some reason, such as a defect in the tape, a judgement that the servo signal is invalid enables switching to the control using the absolute position signal, which allows positioning in the vicinity of the target track to be maintained.

In accordance with the invention, a magnetic tape device having a means for reducing the friction between the tape and head will now be described. The structure of the magnetic tape device is the same as that shown in FIG. 1, except for the area of the head.

Figure 7:
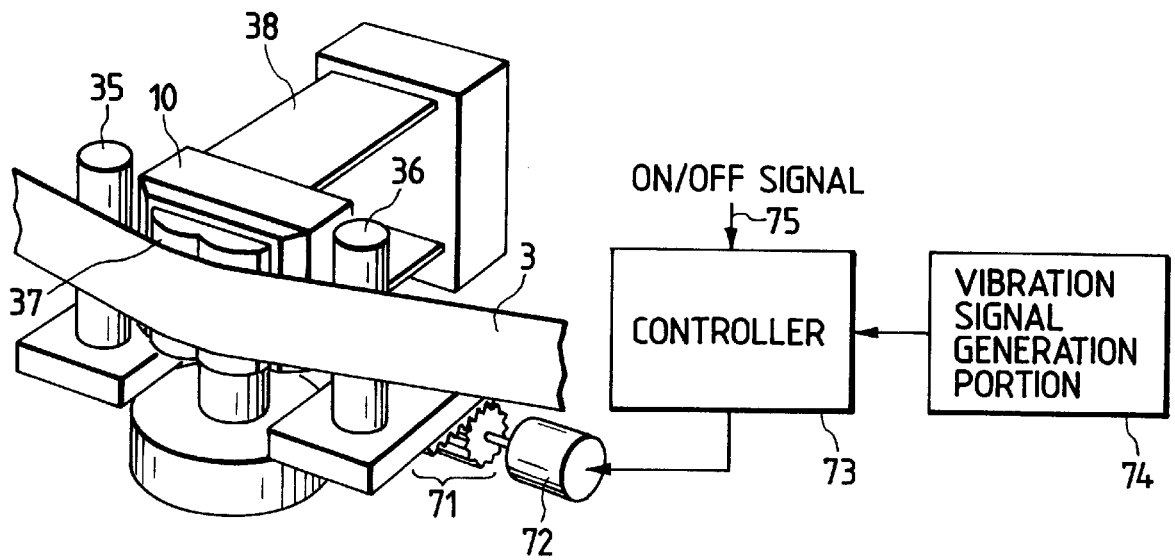
FIG. 7 is a perspective view of a magnetic tape device of the invention with a friction reducing mechanism thereof in an operating state.
Figure 8:
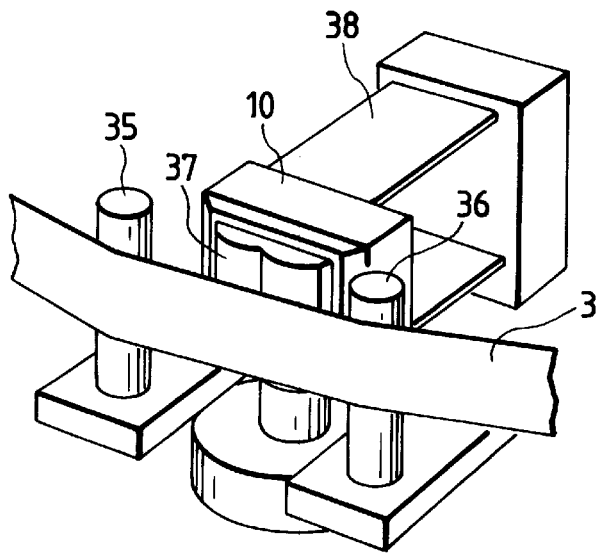
FIG. 8 is a perspective view of the magnetic tape device of the invention with the friction reducing mechanism thereof in an non-operating state.

FIG. 7 shows a device for separating the tape from the head provided as the friction reducing means in a nonoperating state. FIG. 8 shows the tape separating device in operation. The tape separating device in the present embodiment is constituted by pins 35 and 36 having smooth sides provided adjacent to the head 10 and a driving means for the same. As illustrated, this driving means may be constituted by a gear 71, a motor 72 for driving the gear 71, a controller 73 for controlling the motor 72, etc., which driving means moves the pins 35 and 36 in a direction perpendicular to the surface of the tape in response to an on/off signal 75. Such a driving means is similarly provided on the side of the guide pin 35, although not shown. Further, other kinds of driving means, such as a linear solenoid and a piezoelectric element, may be used.

The pins 35 and 36 may be replaced with rollers. In this case, although the wear of the tape surface can be reduced, high production accuracy is required.

The pins 35 and 36 move the tape 3 away from the head surface 37, i.e., move the tape 3 into the state shown in FIG. 8 wherein it is separated from the head surface 37 by a small distance, only in an operational state wherein the tape speed is lower than V0 and the head 10 is moved by a large amount of displacement, as in the track switching operation (step 26). In other operational states, they are retracted to and on standby in the position shown in FIG. 7, where they are not in contact with the tape. One reason is that the friction between the tape and head is small when the tape is moving at a high speed above the speed V0, and this results in only a small tape shift during the head movement which does not require the tape to be retracted by the tape separating device. Another reason is that no movement with small displacement, such as in a follow-up operation, occurs when the tape speed is low.

Figure 9:
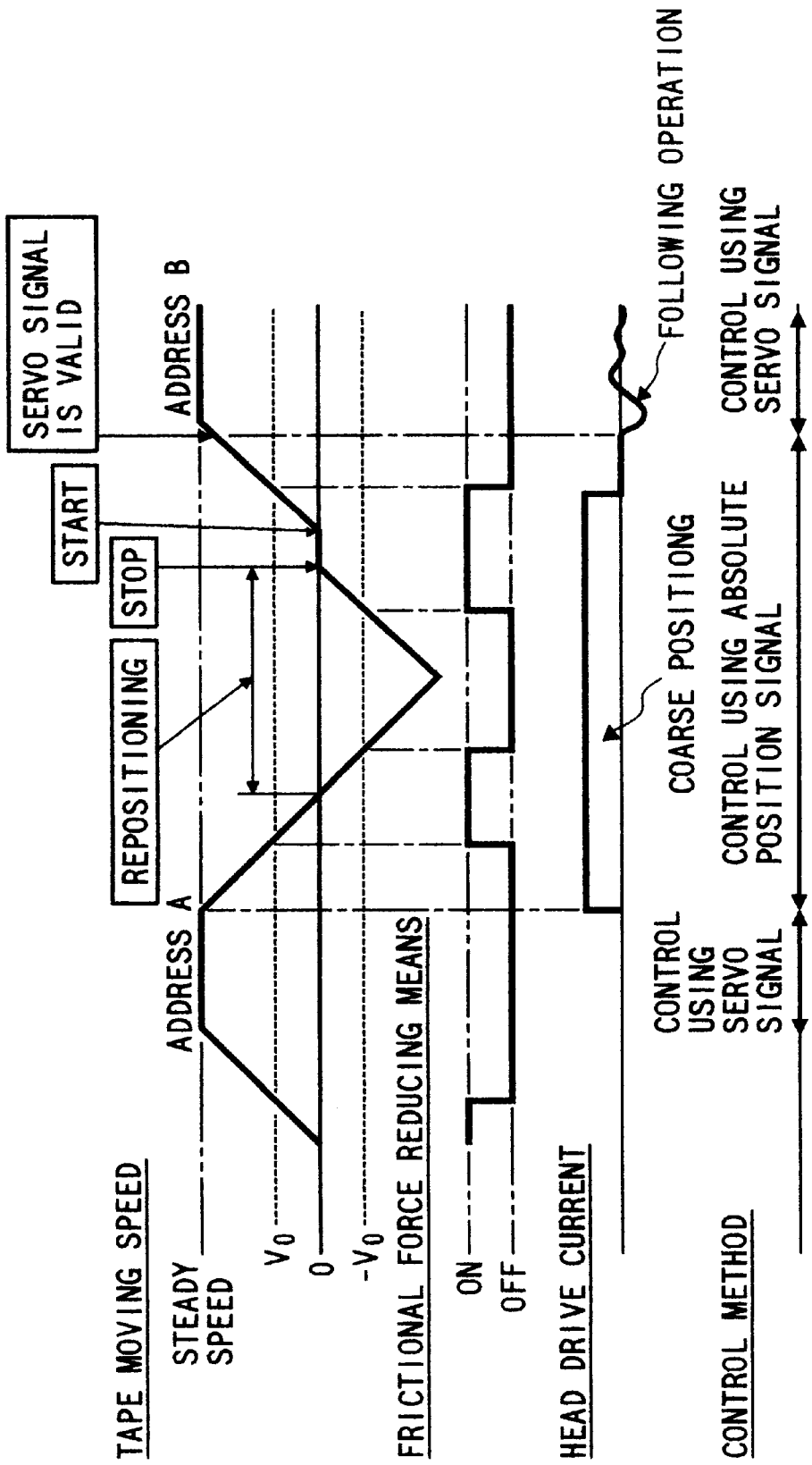
FIG. 9 is a timing diagram for an operation of the magnetic tape device of the invention in response to a record or read command with the friction reducing mechanism in the operating state.

FIG. 9 shows a time chart for the operation of the device of the present embodiment.

FIG. 9 also shows an example of the operation of moving to an address B to read data b after data a is read. During the repositioning of the tape, the head is moved with the device in the non-operating (off) state, if the tape speed is equal to or higher than the speed V0; while the head 10 is moved with the device being operated and the tape 3 being retracted by the pins, if the speed is equal to or lower than V0.

Although the servo track on the tape can not be read when the tape is retracted from the head by the above mentioned friction reducing device, there is no problem because positioning is performed according to the signal from the absolute position detection portion during this coarse positioning. Therefore, such a friction reducing device allows a head moving operation to be performed even with a very high friction coefficient when the tape is stopped. As a result, the time available for head movement can be longer than that in the first embodiment, and the time before the commencement of the recording or reading of information can be reduced.

Although the guide pins 35 and 36 shown in FIG. 7 are moved in parallel with the center axis in the longitudinal direction thereof in the above-described example, a similar friction reducing effect can be obtained by rotating the guide pins so that they fall on the tape 3 to move the tape away from the head surface 37. In such a configuration, however, since the tape is twisted about an axis in the longitudinal direction thereof, the tape moving system must include a means for suppressing the meandering of the tape to prevent such a twist from hindering the movement of the tape.

If tapes are stored under bad conditions for a long period, some tapes gather dust thereon and some tapes become extremely sticky. If such a tape is used, it sticks to the head and can even become unmovable. The present embodiment is also advantageous in the case of such a trouble in that the tape 3 can be separated from the head 10 by moving the head 10 with a load applied by the pins 35 and 36 in a direction away from the head surface 37, thereby reducing the time required for recovery.

In accordance with the invention, a description will be given of another example of a magnetic tape device wherein the friction between the tape and head is reduced to suppress a tape shift. The structure of the magnetic tape device of this embodiment is the same as that shown in FIG. 1, except for the area of the head.

Figure 10:
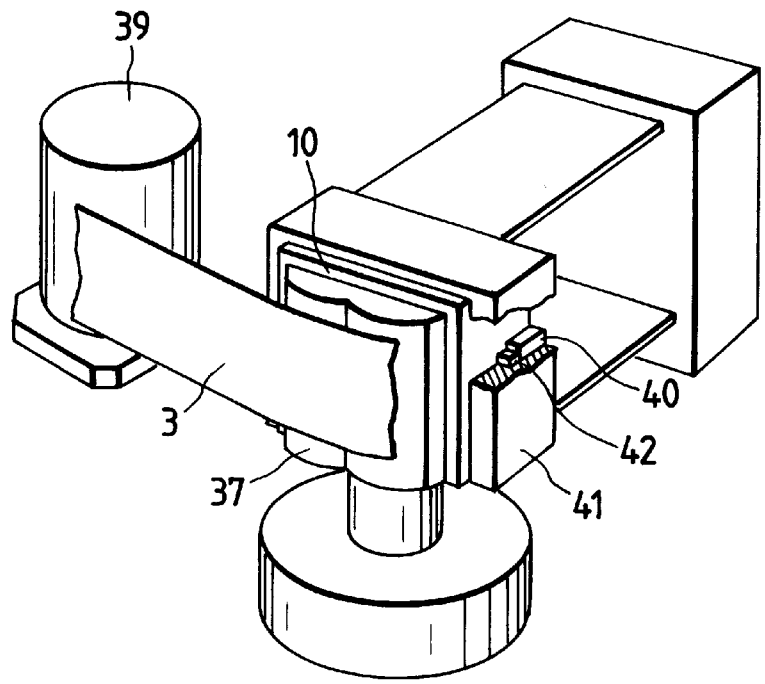
FIG. 10 is a perspective view of a magnetic tape device of the invention illustrating another embodiment of a head reducing mechanism.

FIG. 10 is a perspective view of a head supporting mechanical system having a mechanism for retracting the head. A tab 40 attached to a central portion of this system, including the head 10, is pushed by an piezoelectric element 42 provided on a head housing 41 in the direction away from the tape 3. It is desirable that the head is retracted until the head surface 37 is detached from the tape 3. Even if this is not achievable, a decrease in the angle at which the tape 3 is wrapped around the head surface 37 reduces the contact force therebetween. This reduces the frictional force, resulting in the same effect. The procedures for this operation, such as the timing of the retraction of the head, are the same as those described with reference to FIG. 9. The present embodiment is advantageous in that components other than the head 10 and a guide 39 can be kept away from the head 10.

Figure 11:
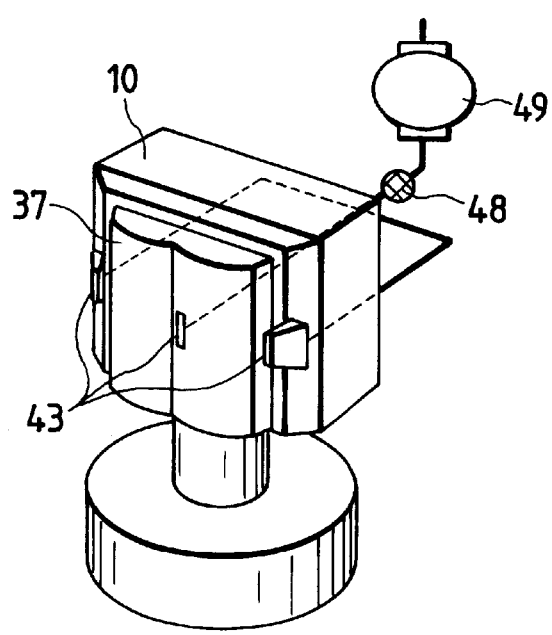
FIG. 11 is a perspective view of a magnetic tape device of the invention illustrating another embodiment of a head portion of the friction reducing mechanism.

In accordance with the invention, FIG. 11 shows an example of a magnetic tape device wherein the tape is floated by the static pressure of air. The structure of the magnetic tape device is the same as that shown in FIG. 1, except for the area of the head. In this embodiment, a nozzle 43 is provided in the middle of the head, or before and after the head in the longitudinal direction of the tape adjacent to the head, to blow air at the same timing as the movement of the pins 35 and 36 in the arrangement of FIG. 7, thereby floating the tape 3.

The air is supplied to the nozzle 43 by a pump 49 and is pressurized to a level sufficient to float the tape. A valve 48 is switched when this device is not operating to eject the excess air remaining in the gap between the head surface 37 and the tape surface, so that the effect of a dynamic pressure air bearing produced between the head surface 37 and the tape will not be reduced when the tape is moved at a speed above V0.

This mechanism resembles the technique disclosed in Japanese examined patent publication No. H4-8842 on a fixed head type magnetic tape device. In the device disclosed in this publication, air is blown when the tape is started and is stopped when the tape is moving. The device of the present invention is completely different from this in that it starts blowing air when the head is activated and essentially continues to blow air regardless of the operation of the tape. Although air is preferably blown continuously, it may be intermittently blown.

In the above-described arrangements of FIGS. 10 and 11, as in the arrangement of FIG. 7, the servo track can not be read when the device for reducing the friction between the tape and head is in operation, because the tape 3 is displaced away from the head surface 37 in such a state. In either case, however, since positioning in the vicinity of the target track can be achieved by the servomechanism utilizing the absolute position, there will be no increase in the time spent before the commencement of data recording or reading.

In light of the fact that the friction between the tape and head originates in a contact force that is produced when the tape is pressed against the head, since such a contact force originates in a component in an out-of-plane direction produced in the tape tension, which is a force in an in-plane direction of the tape when the tape is wrapped around the head, a temporary decrease in the tension of the tape reduces the contact force to consequently reduce the frictional force.

Tension control is performed by controlling the rotational speed of the reel 1 and 2 using the reel motor controller 6 shown in FIG. 1. Upon receipt of a signal indicating the start of the head movement from the positioning controller 8, the reel motor controller 6 sets the tension at a value smaller than a preset reference tension value to be applied to the tape 3 during steady movement of the tape, after it is confirmed that the tape moving speed is less than V0. The tension value smaller than the reference set at this time is preferably greater than zero because otherwise the tape can come off. If the tape is moved with low tension, troubles associated with tape movement, such as the meandering of the tape and fluctuations of the tape speed, can occur more easily. Therefore, upon the activation of the head, the reel motor controller 6 immediately resets the tension to the original reference value. If the tape speed is higher than V0, it is not necessary to change the above-described set tension value.

There is another method for reducing friction wherein the friction coefficients of the surfaces of the tape and head are decreased by vibrating the tape surface or the tape minutely.

In accordance with the invention, an example including such a friction reducing means will be described with reference to FIG. 1 and FIG. 2. First, by making use of the movability of the magnetic head in the direction of the width of the tape, a configuration is employed wherein the positioning controller 8 for generating a drive signal can superimpose a bias signal, which fluctuates at a predetermined frequency, on the drive command signal input to the magnetic head driving means 7. For this purpose, as shown in FIG. 1, there is provided a bias signal generation portion 101 which inputs the bias signal to the positioning controller 8. When the head moves at a tape moving speed equal to or lower than V0 for positioning the head, the above-described variable bias signal is superimposed to vibrate the head 10 in the direction of the width of the tape. Such a movement reduces friction, thereby reducing the amount of the tape drag. However, the above-mentioned frequency must be different from the resonant frequency of the head supporting system.

In accordance with the invention, another example, including a friction reducing means, will be described with reference to FIG. 10. If the head 10 is configured so that it can be moved perpendicularly to the surface 37 thereof, on which the tape slides, an arrangement is made to make it possible to input a signal for vibrating the head 10 at a predetermined frequency to the piezoelectric element 42, which is a means for driving the head in that direction. When the head is moved in the direction of the width of the tape and the moving speed of the tape is equal to or lower than V0, the head is vibrated by the above-mentioned input to reduce the friction between the tape 3 and the head surface 37.

While the head may be vibrated as described above, a method wherein the tape is vibrated will be described with reference to FIG. 7. As shown in FIG. 7, a signal fluctuating at a predetermined frequency (vibration signal) is input from a vibration signal generation portion 74 to the controller 73 and is superimposed on the drive signal to the actuator 72 to vibrate the guide pins 35 and 36 provided adjacent to the head. This provides a similar effect to that described above. The operation of vibrating the guide pins is performed under the same conditions as described previously with reference to the arrangement shown in FIG. 7. Specifically, operation is enabled, as shown in FIG. 8, only when the tape is moved at a speed equal to or lower than V0 while the head is moved. It is preferable that the guide pins 35 and 36 are not in contact with the tape 3, as shown in FIG. 7, when they are not required.

There is another possible method of vibrating the tape, as follows. One or more holes facing the tape surface, such as a air blast nozzle 43, as seen in FIG. 11, are provided in the surface of the head on which the tape slides, or in the vicinity of the sliding surface. Inside such a hole, there is provided a thin film, whose surface does not project above the sliding surface 37, instead of a vent pipe, an electromechanical conversion element is provided, which is partially in contact with the thin film, and an vibrator and an amplifier are provided for vibrating the conversion element at a certain frequency and for inputting a signal which generates a sound. With this arrangement, the tape is vibrated by the sound wave.

The use of such a sound generating feature also results in a possibility that a valid signal can not be read from the servo track on the tape. However, this creates no problem because positioning is controlled using the absolute position signal when such a friction reducing means is in operation.

In all of the above-described arrangements, the effect of reducing tape shift during the movement of the head can be further enhanced by providing elements as described below.

Figure 16:
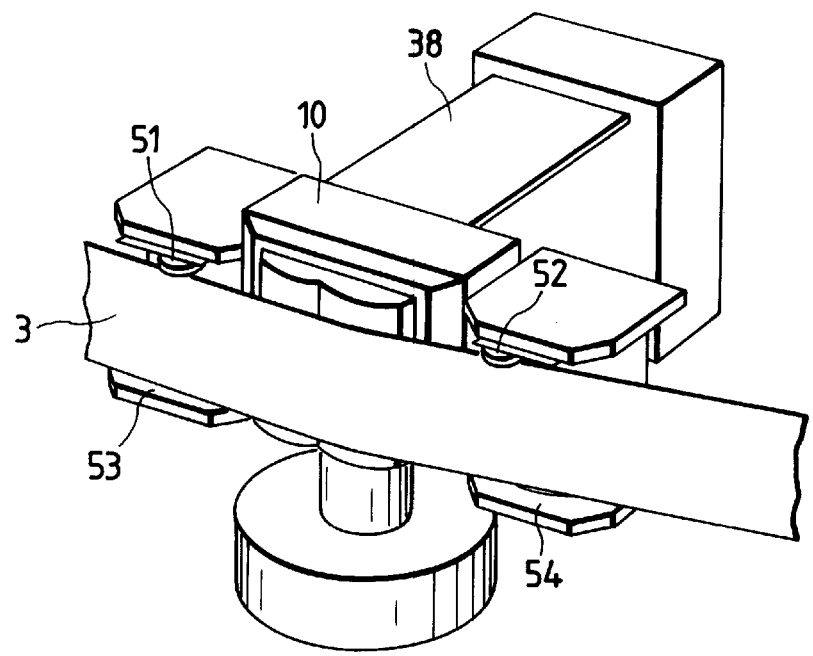
FIG. 16 is a perspective view of a magnetic tape device of the invention illustrating an example of guides provided in close proximity to the head for regulating the movement of the head in the direction of the width of a tape.

As shown in FIG. 16, guides 51, 52, 53, and 54, which contact the edges of the tape in the direction of the width thereof to regulate the tape in the direction of the width thereof, are provided in spaces before and after the head 10 in the longitudinal direction of the tape so that they are not in contact with the head 10, but are located as close as possible thereto. Such regulation of the movement of the tape in the direction of the width thereof allows the amount of tape shift to be reduced. However, if the tape guides 51 through 54 are used alone, where the friction between the surfaces of the head and tape is very high, troubles such as the folding of the tape in the vicinity of the edges in the direction of the width thereof may occur. It is therefore preferable that the tape guides are used with the friction reducing means as above-described arrangements.

Next, a specific structure of the head position detection means 15 in the system of FIG. 1 will be described in accordance with the invention.

Figure 12:
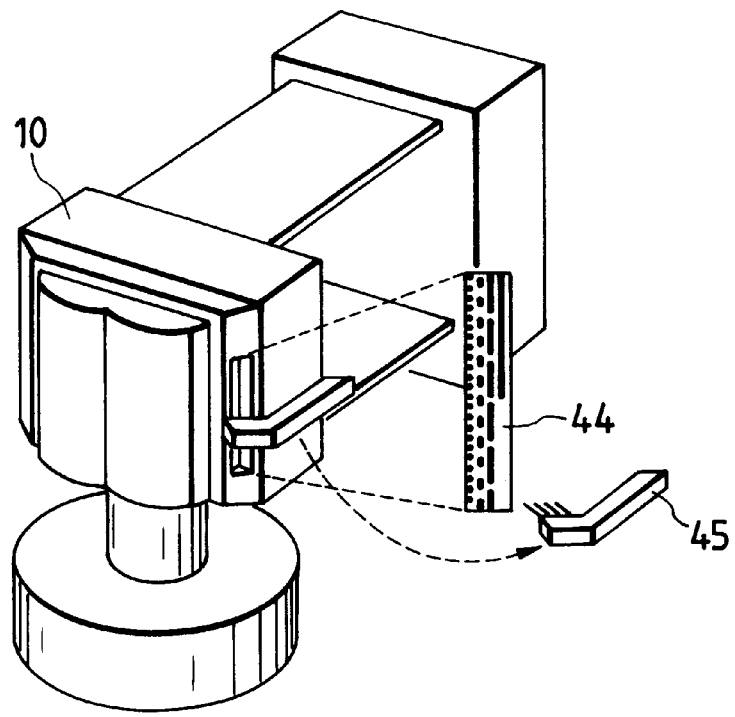
FIG. 12 is a perspective view of a magnetic tape device of the invention illustrating a head displacement detection means provided at a head portion.

FIG. 12 is a perspective view illustrating a peripheral structure of the head 10 wherein an optical pattern 44 is printed on a side thereof as a scale for absolute positions, which pattern 44 is read by an optical detection means 45.

This provides the same effect as that which can be achieved by providing a linear encoder extending in the direction in which the head 10 is driven. Such a configuration wherein the output of the displacement detection means itself serves as an absolute position coordinate system is advantageous in that no calibration is required. Further, the effect of thermal expansion and vibration of the head can be reduced.

Figure 13:
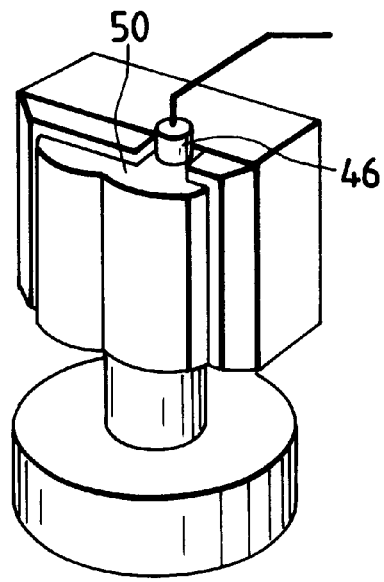
FIG. 13 is a perspective view of a magnetic tape device of the invention illustrating another embodiment of the head displacement detection means provided at the head portion.
Figure 14:
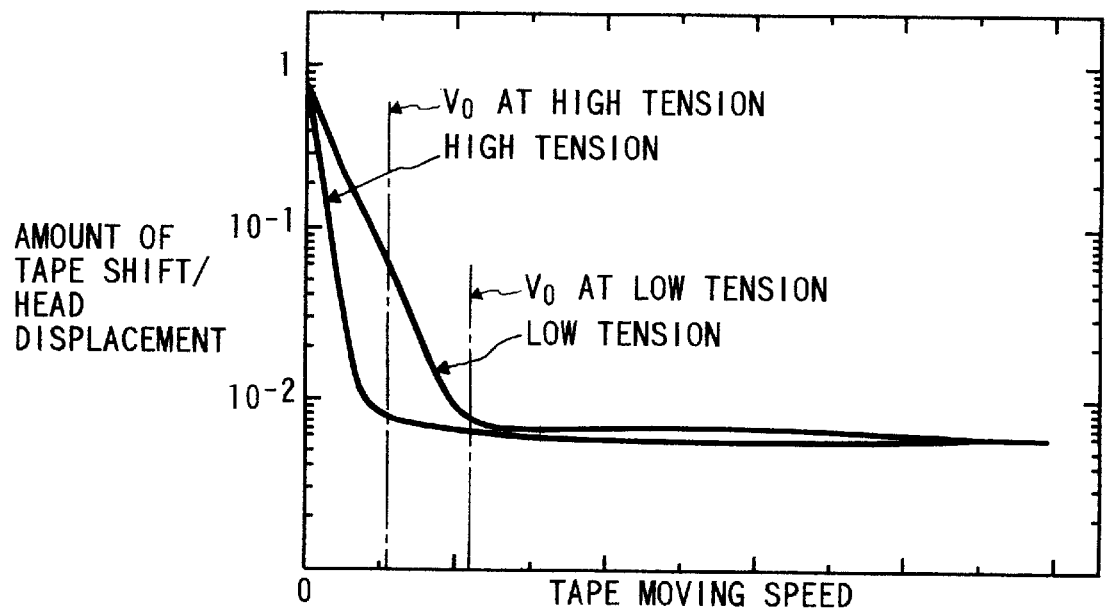
FIG. 14 is a characteristic diagram which illustrates the relationship between the amount in which a tape of a magnetic tape device is dragged and the moving speed of the tape.
Figure 15:
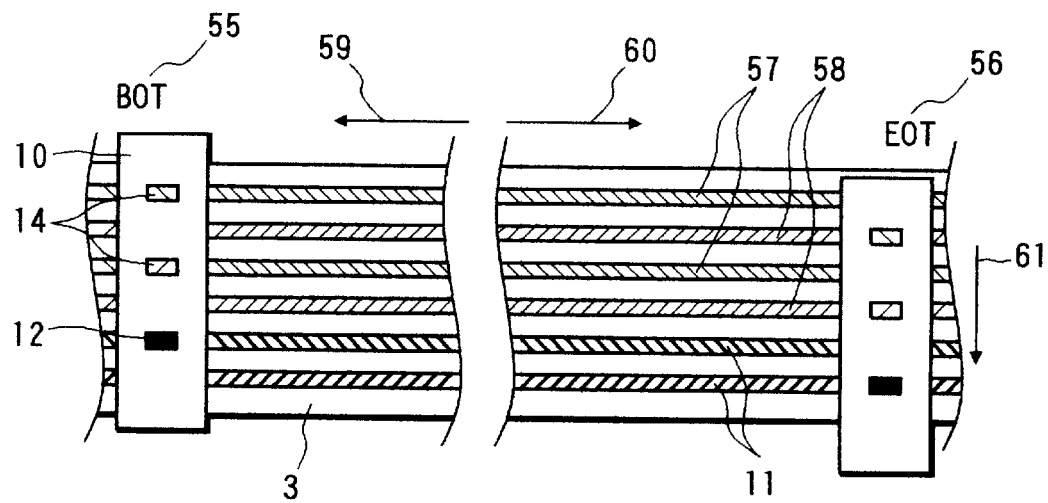
FIG. 15 is a diagram which shows a conventional serpentine type track switching arrangement.

FIG. 13 shows another arrangement of the head position detection means 15 according to the invention. As shown in FIG. 13, a displacement sensor 13 is provided in a face-to-face relationship with an upper surface 50 of the head to measure the displacement of the upper surface 50 of the head and output this measure of the displacement as a head displacement signal. This configuration is advantageous in that it simplifies the manufacture of the head, although problems arise in that the positioning of a head core in a position far from the upper surface becomes somewhat inaccurate when the head itself undergoes thermal expansion because only the upper surface of the head (displacement measuring surface) 50 is controlled, and in that the sensor 46 itself must be calibrated in advance.

If a means for detecting the displacement of a movable element is incorporated in the linear actuator, another configuration is possible wherein a signal corresponding to the displacement of the head is directly obtained from the actuator. In summary, any means capable of detecting the displacement of the head itself will provide an equivalent device.

The above-described embodiments of the present invention allow a head to be positioned at a track with high accuracy. This makes it possible to increase the track density of a magnetic tape device and to increase the storage capacity of a magnetic tape dramatically.

In addition, since track switching is performed while the tape is being repositioned at a target block, data can be recorded and/or read in the same period as in the case of conventional fixed head type magnetic tape devices. Thus, track switching can be performed at a high speed and with high accuracy. As a result, a magnetic tape device which has been primarily operated as a sequential recording system, i.e., operated to continuously record and/or read information (streaming) can now be used as a random recording system typical of magnetic disc devices, which performs recording and/or reading on any track and in any block.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A magnetic tape device wherein a servo signal read from a servo track provided on a magnetic tape and a magnetic head having one or more head cores is moved in the direction of the width of the tape to position said head cores on predetermined data tracks, comprising:

a positioning control portion for controlling the positioning of said magnetic head, said positioning control portion being responsive to a moving speed of the tape and controlling said magnetic head So that said magnetic head moves between different data tracks in the direction of the width of the tape when the tape is moving at a speed equal to or higher than a predetermined value greater than zero and said magnetic head does not move between the different data tracks when the tape is moving at a speed below the predetermined value including when the tape is stationary.

2. The magnetic tape device according to claim 1, further comprising:

a guide provided on the magnetic head, which guide is put in contact the magnetic tape in the direction of the width thereof for regulating the movement of the magnetic tape in the direction of the width thereof.

3. A magnetic tape device according to claim 1, wherein said positioning control portion is responsive to the moving speed of the tape for controlling said magnetic head so that said magnetic head moves between different data tracks in the direction of the width of the tape only when the tape is moving at the speed which is equal to or higher than the predetermined value greater than zero and for controlling said magnetic head so not to move said magnetic head when the tape is not moving at a speed equal to or higher than the predetermined value greater than zero.

4. A magnetic tape device wherein a magnetic head is positioned in the direction of the width of a magnetic tape, comprising:

a contact-vibration means which contacts an end of the magnetic tape in the direction of the width thereof or a surface of the magnetic tape and which vibrates the magnetic tape in the direction of the width thereof or in an out-of-plane direction;

a driving means for moving said contact-vibration means so that the contact-vibration means is put into contact with and moved away from the magnetic tape; and a control portion for controlling said driving means in response to a speed of movement of the magnetic tape so that said driving means moves the contact-vibration means to a position where the contact-vibration means contacts the magnetic tape when the moving speed of the magnetic tape is higher than zero and equal to or lower than a predetermined value.

5. A magnetic tape device according to claim 4, wherein said control portion controls said driving means so that said driving means moves the contact-vibration means to a position where the contact-vibration means contacts the magnetic tape only when the moving speed of the magnetic tape is higher than zero and equal to or lower than the predetermined value and controls said driving means so that the contact-vibration means is out of contact with the magnetic tape when the magnetic tape is not moving at a speed which is higher than zero and equal to or lower than the predetermined value.

6. A method of controlling a magnetic tape device which includes a moving means for moving a magnetic head having one or more head cores in the direction of the width of a magnetic tape and wherein a servo signal is read from a servo track provided on the magnetic tape to position the magnetic head in the direction of the width of the magnetic tape, the method comprising the steps of:

coarsely positioning the magnetic head in the vicinity of a target track in the direction of the width of the magnetic tape and in response to a speed of movement of the magnetic tape which is equal to or higher than a predetermined value greater than zero during the repositioning of the magnetic head to the magnetic tape and not positioning the magnetic head when the magnetic tape moves at a speed lower than the predetermined value including when the magnetic tape is stationary; and starting the following of the target track immediately before a recording or reading operation is started on the target track specified on the magnetic tape.

7. A method according to claim 6, wherein the step of coarsely positioning the magnetic head in response to a speed of movement of the magnetic tape which is equal to or higher than the predetermined value greater than zero includes moving the magnetic head in response to the speed of movement of the magnetic tape only when the magnetic tape is moving at a speed equal to or higher than the predetermined value greater than zero and not moving the magnetic head when the magnetic tape is not moving at a speed which is equal to or is not higher than the predetermined value greater than zero.

8. A method of controlling a magnetic tape device, comprising the steps of:

positioning a magnetic head in the direction of the width of a magnetic tape according to a servo signal obtained from a servo track on the magnetic tape and in response to a speed of movement of the magnetic tape which is equal to or higher than a predetermined value greater than zero and not positioning the magnetic head when the magnetic tape moves at a speed lower than the predetermined value including when the magnetic tape is stationary;

reciprocating the magnetic head in the vicinity of a target track after the magnetic head is coarsely positioned in the vicinity of a target track during a track switching operation; and following the track thereafter.

9. A method according to claim 8, wherein the step of positioning the magnetic head includes moving the magnetic head in response to the speed of movement of the magnetic tape only when the speed of movement of the magnetic tape is equal to or higher than a predetermined value greater than zero and not moving the magnetic head when the magnetic tape is not moving at a speed which is equal to or is not higher than the predetermined value greater than zero.

10. A method of controlling a magnetic tape device, comprising the steps of:

positioning a magnetic head in the direction of the width of a magnetic tape according to a servo signal obtained from a servo track on the magnetic tape and in response to a speed of movement of the magnetic tape which is equal to or higher than a predetermined value greater than zero and not positioning the magnetic head when the magnetic tape moves at a speed lower than the predetermined value including when the magnetic tape is stationary; and performing one or more reciprocating operations with said head in the direction of the width of the magnetic tape while the magnetic head is moved to a target track from a track to which the magnetic head has been positioned during a track switching operation.

11. A method according to claim 10, wherein the step of positioning the magnetic head includes moving the magnetic head in response to the speed of movement of the magnetic tape only when the speed of movement of the magnetic tape is equal to or higher than the predetermined value greater than zero and not moving the magnetic head when the magnetic tape is not moved at a speed which is equal to or higher than the predetermined value greater than zero.

* * * * *